(12) United States Patent
Tejada et al.

(10) Patent No.: US 6,855,247 B2
(45) Date of Patent: Feb. 15, 2005

(54) CATALYTIC SYSTEM FOR HYDROCONVERSION OF NAPHTHA

(75) Inventors: Jorge Tejada, San Antonio de Los Altos (VE); Nelson P. Martínez, San Antonio de Los Altos (VE); José Antonio Pérez, Carrizal (VE); Leonardo Escalante, San Antonio de Los Altos (VE); José M. Larrauri, Los Teques (VE); José A. Salazar, Carrizal (VE)

(73) Assignee: Intevep, S.A., Caracas (VE)

( * ) Notice: Subject to any disclaimer, the term of this patent is extended or adjusted under 35 U.S.C. 154(b) by 57 days.

(21) Appl. No.: 10/426,675

(22) Filed: Apr. 30, 2003

(65) Prior Publication Data

US 2003/0205505 A1 Nov. 6, 2003

Related U.S. Application Data

(62) Division of application No. 09/932,297, filed on Aug. 17, 2001.

(51) Int. Cl.$^7$ .............................................. C10G 45/00
(52) U.S. Cl. .................. 208/213; 208/216 R; 208/217; 502/63; 502/61; 502/64; 502/67; 502/77
(58) Field of Search ............................ 208/213, 216 R, 208/217; 502/61, 64, 67, 77, 718

(56) References Cited

U.S. PATENT DOCUMENTS

| | | | |
|---|---|---|---|
| 5,254,327 A | 10/1993 | Martinez et al. | |
| 5,354,719 A | 10/1994 | Gabelica et al. | |
| 5,576,256 A | 11/1996 | Monque et al. | |
| 5,591,324 A | 1/1997 | Monque et al. | |
| 5,770,047 A | 6/1998 | Salazar et al. | |

FOREIGN PATENT DOCUMENTS

EP    1 013 339 A2    6/2000

*Primary Examiner*—Walter D. Griffin
*Assistant Examiner*—James Arnold, Jr.
(74) *Attorney, Agent, or Firm*—Bachman & LaPointe, P.C.

(57) ABSTRACT

A hydroconversion catalyst for hydrodesulfurizing feedstock while preserving octane number of the feedstock includes a support having a mixture of zeolite and alumina, the zeolite having an Si/Al ratio of between about 1 and about 20, and an active phase on the support and including a first metal selected from group 6 of the periodic table of elements, a second metal selected from the group consisting of group 8, group 9 and group 10 of the period table of elements and a third element selected from group 15 of the periodic table of elements. A hydroconversion process is also disclosed.

14 Claims, 3 Drawing Sheets

CATALYTIC SYSTEM FOR HYDROCONVERSION OF NAPHTHA

CROSS REFERENCE

The instant application is a divisional of U.S. application Ser. No. 09/932,297 filed on Aug. 17, 2001, which is currently pending.

BACKGROUND OF THE INVENTION

The invention relates to a catalytic system which is advantageous in hydroconversion of hydrocarbon feeds such as naphtha.

Many nations have implemented environmental legislation and energy conservation policies which idealize stringent rules in order to drastically reduce emissions of contaminants such as sulfur.

Clean air act amendments and other legislation have mandated reductions in emission levels in terms of sulfur, olefins, aromatics and the like, which are considered to contribute to contamination levels.

One source of volume to the gasoline pool is naphtha, particularly FCC naphtha, which is the source of approximately 80% of the sulfur in the gasoline pool. Further, such FCC naphtha also constitutes approximately 40% (vol) of the total amount in the gasoline pool.

Clearly, FCC naphtha is an important feed to be treated for reduction of sulfur.

Various hydroconversion processes have been developed for treating such feedstocks in order to reduce sulfur content thereof. One such process involves a first stage wherein sulfur and nitrogen are substantially removed, but also wherein olefins contained in the feedstock are greatly saturated. In such processes, the saturation of olefins results in a loss in octane values, and a second stage treatment is employed in order to recuperate the lost octane values.

In the reformulation of gasoline, an octane loss is expected to occur due specifically to hydrogenation of olefins (HDO). This loss is compensated or recovered through cracking reactions, isomerization, aromatization, and the like, which can be accomplished during the aforesaid second stage of the reaction.

Hydroconversion catalysts are conventionally sensitive to nitrogen in the feed, and can require pre-treatment of the feed to remove nitrogen, which also adds a step and additional cost to the preparation process.

Of course, any required second stage or step adds to the processing cost for fractions such as naphtha, and therefore the need exists for improved methods of reduction in sulfur and nitrogen content without adverse impact on octane values (RON, MON).

It is therefore the primary object of the present invention to provide a catalyst and process for using same whereby the need for additional reaction zones is avoided.

It is a further object of the present invention to provide a catalyst and process for using same wherein hydrodesulfurization and hydrodenitrification are accomplished.

It is a still further object of the invention to provide a catalyst which is resistant to nitrogen and can avoid the need for pre-treatment to remove nitrogen from the feed.

Other objects and advantages of the present invention will appear herein below.

SUMMARY OF THE INVENTION

In accordance with the present invention, the foregoing objects and advantages have been readily attained.

According to the invention, a hydroconversion catalyst is provided which is effective in hydrodesulfurizing feedstocks while preserving octane numbers, which catalyst comprises a support comprising a mixture of zeolite and alumina, said zeolite having an Si/Al ratio of between about 1 and about 20, and an active phase on said support and comprising a first metal selected from group 6 of the periodic table of elements, a second metal selected from the group consisting of group 8, group 9 and group 10 of the periodic table of elements, and a third element selected from the group 15 of the periodic table of elements.

In further accordance with the present invention, a process for hydroconversion of hydrocarbon feedstock is provided, which process comprises providing a hydrocarbon feed having an initial sulfur content and an initial olefin fraction; providing a hydroconversion catalyst comprising a support comprising a mixture of zeolite and alumina, said zeolite having an Si/Al ratio of between about 1 and about 20, and an active phase on said support and comprising a first metal selected from group 6 of the periodic table of elements, a second metal selected from the group consisting of group 8, group 9 and group 10 of the periodic table of elements, and a third element selected from the group 15 of the periodic table of elements, and exposing said feed to said catalyst under hydroconversion conditions so as to provide a product having a final sulfur content less than said initial sulfur content. The olefin content of the final product varies depending upon the operating conditions used to process the feedstocks. In some cases, the olefin retention is very high and for other cases, the olefin content is substantially lower than the initial olefin content. Advantageously, however, the catalyst of the present invention provides for increased ratio of iso-paraffins to n-paraffins and reduction in molecular weight of the n-paraffins which serve to improve octane ratings of the product and help make up for the olefin loss which itself is reduced in any event.

BRIEF DESCRIPTION OF DRAWINGS

A detailed description of preferred embodiments of the present invention follows, with reference to the attached drawings, wherein.

DETAILED DESCRIPTION

The invention relates to a catalyst and catalyst system for hydroconversion of hydrocarbon feedstocks such as naphtha, and provides for reduction of sulfur in naphtha feedstock cuts without substantial reductions in octane values, which is common with hydrotreating using conventional catalysts.

The octane value of a particular hydrocarbon fraction such as naphtha fractions and the like has been found to depend upon the number of carbon atoms in the various hydrocarbon fractions contained therein. One important fraction is the olefin fraction, and this fraction has been found to be extremely susceptible to hydrogenation when subjected to conventional hydrodesulfurization (HDS) catalysts. The result is that various gasoline pool additives such as naphtha, which must be treated with HDS catalysts, have reduced octane values and require a second treatment stage for recuperating the octane value.

Figure 1:
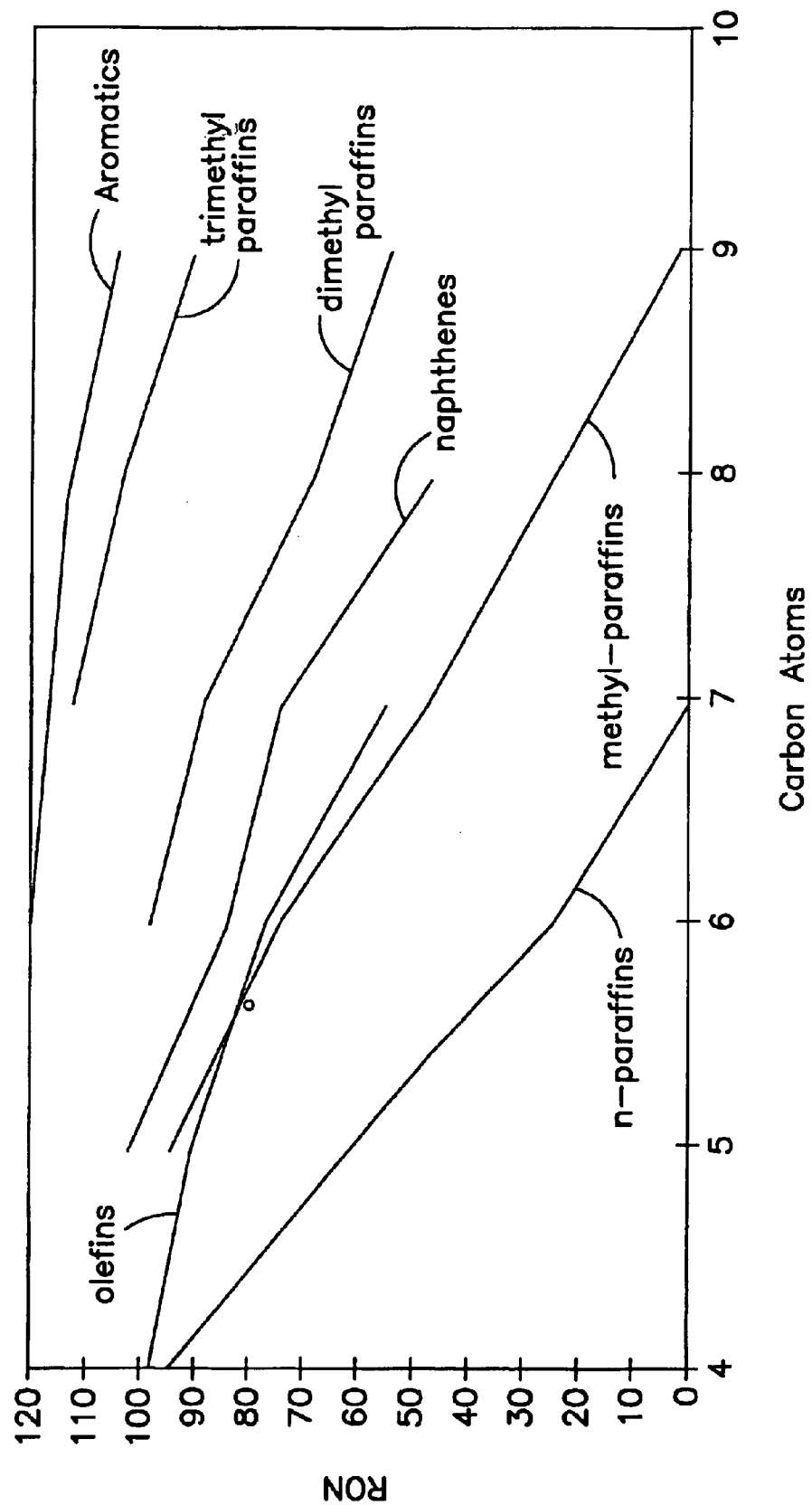
FIG. 1 illustrates the relationship between carbon atoms of various hydrocarbon fractions and research octane number (RON)

FIG. 1 shows a relationship between research octane number (RON) and the number of carbon atoms for various hydrocarbon fractions of a typical gasoline pool fraction. As shown, the RON value decreases substantially as the number of carbon atoms for each fraction, including the olefins, increases.

In accordance with the present invention, a catalyst system has been devised which advantageously provides for excellent HDS activity, and which also provides excellent hydroconversion activity, and which avoids the substantial decreases in octane values which are caused by conventional hydrotreating catalyst systems. In addition, the catalyst system of the present invention is tolerant to nitrogen, and can therefore be used in a single treatment stage or reactor for treating feedstocks having sulfur, nitrogen and the like, and provides a product with substantially reduced sulfur and nitrogen content with octane values either unchanged or reduced slightly, and in some cases improved.

In accordance with the present invention, the catalyst system includes a support component and an active phase on the support component. The support component in accordance with the present invention is preferably a silicon and aluminum structure such as zeolite, aluminosilicate, silica and alumina mixtures, and the like. In accordance with the present invention, it has been found that excellent HDS activity, with tolerance to nitrogen and also good HDN activity, can be accomplished with substantial hydroconversion activity so long as the ratio of silicon to aluminum in the zeolite is between about 1 and about 20. The Si/Al ratio is critical in that higher ratios result in poor hydroconversion activity and resulting loss in octane values. It is preferred that the zeolites have an Si/Al ratio less than about 15, and more preferably less than about 12. ST-5 zeolite having an Si/Al ratio of 11.7 is particularly well suited to the present invention.

The support is preferably a mixture of zeolite and alumina, and preferred zeolite is MFI zeolite, most preferably ST-5 zeolite as set forth above. Suitable ST-5 zeolite is disclosed in U.S. Pat. No. 5,254,327. Such a zeolite can be combined with appropriate amounts of alumina to provide the desired acid catalysis. Such a zeolite has been found to provide excellent selective cracking and isomerization activities while avoiding octane loss.

The active metal phase to be deposited on or otherwise provided along with the support preferably includes a first metal selected from group 6 (CAS group VIB) of the periodic table of elements, most preferably molybdenum. The active metal phase also includes a second metal preferably selected from the group consisting of group 8, group 9 and group 10 (CAS group VIII) of the periodic table of elements, preferably nickel, cobalt or mixtures thereof, most preferably cobalt, and a third element selected from group 15 (CAS VA) of the periodic table of elements, most preferably phosphorus.

In accordance with the present invention, the catalyst preferably includes metal active phase having at least about 1% (wt) of the first metal (group 6), at least about 0.5% (wt) of the second metal (groups 8, 9 and 10), and at least about 0.2% (wt) of the third element (group 15). More preferably, the catalyst includes the first metal, preferably molybdenum, in an amount between about 2 and about 15% (wt), the second metal, preferably nickel or cobalt, in an amount between about 0.5 and/or about 8.0% (wt), and the third element, preferably phosphorus, in an amount between about 0.5 and about 5.0% (wt). This combination of active metals and elements for a support as described above has been found in accordance with the present invention to provide the desired HDS and HDN activity along with other activity that compensates for olefin hydrogenation (HDO) so as to provide a final product having acceptable octane values.

As demonstrated in the Examples, the catalyst according to the present invention advantageously provides for increase in molar ratio of iso-paraffin to n-paraffin, and also reduces molecular weight of the n-paraffin fraction, both of which improve octane values of the final product and thereby substantially compensate for the HDO activity of the catalyst.

In accordance with the present invention, the acidity of the catalyst has also been found to be important in connection with the desired tolerance to nitrogen and acid catalyst activity such as selective cracking and isomerization reactions.

A suitable catalyst in accordance with the present invention can be prepared using known techniques, and following processes well known to a person of ordinary skill in the art. The zeolite is preferably mixed with alumina under protonic form, and both in powder form, and the zeolite and alumina are preferably mixed at a proportion of between about 10 and about 90% (wt) zeolite and between about 90 and about 10% (wt) alumina. To the mixture of zeolite and alumina, a peptizing agent may also be added such as, for example, acetic acid and the like, preferably in amounts of between about 0.5 and about 3.0% (wt), and the resulting mixture is a paste which is extruded into appropriate forms, such as, for example, $\frac{1}{16}$" extrudates. The extrudates are then dried, preferably at room temperature, and then at a temperature of 120° C., and the dried extrudates are then calcined, for example at a temperature of about 550° C. for approximately 2–4 hours. Calcination may preferably be carried out at a heating velocity of 60° C. increases per hour, until the desired temperature is reached.

After calcination, the extrudates are preferably impregnated with the group 15 active element (preferably phosphorus), and the group 6 active metal (preferably molybdenum). After this impregnation step, the impregnated extrudates are dried, for example using the same procedure, preferably at room temperature and then a temperature of about 120° C., and after drying, the extrudates are further impregnated with the metal of group 8, 9 or 10, preferably nickel and/or cobalt, so as to complete the active metal phase impregnation onto the support structure. Of course, the catalyst may be impregnated in different ways, as well, and can be prepared using any known technique or process.

The impregnated extrudates are then dried again at room temperature followed by 120° C., calcined at approximately 550° C. for a sufficient period of time and at a heating velocity at set forth above, and the catalyst is then complete.

The catalyst may also be prepared by co-extruding the zeolite, alumina and active metals. The extrudates are formed and impregnated at the same time, and are dried and then calcined using a similar process as described above.

Before use, the catalyst may be subjected to activation, pre-sulfurization, and other steps which are known to a person of ordinary skill in the art, at which time the catalyst is ready for use in processes for hydroconversion in accordance with the present invention.

A particularly suitable feedstock with which the catalyst of the present invention is useful is a naphtha feedstock, preferably a non-hydrotreated FCC naphtha (C9+) having at least about 5% (wt) of olefins, such as that which can be obtained from the Amuay or from other refineries, for example. The typical characteristics of such a composition are as set forth in Table 1 below.

TABLE 1

| Contents | Composition (% weight) |
|---|---|
| Paraffins | 3.09 |
| Isoparaffins | 12.2 |
| Olefins | 8.6 |
| Naphthenes | 10.3 |
| Aromatics | 61.6 |
| Non-identified, C13+ | 1.7 |
| Sulfur | 1930 ppm |
| Nitrogen | 186 ppm |

Of course, the catalyst in accordance with the present invention can advantageously be used with a wide variety of feedstocks, and the feed set forth in Table 1 is merely an example of a suitable feed. The particularly desirable characteristics of feed which are suitable for treatment with the catalyst of the present invention, however, include a feed which requires at least HDS, and optionally HDN as well, which includes an olefin fraction, and which is to be incorporated into the gasoline pools. The feedstock can further contain at least about 1 ppm weight of nitrogen. With such a feedstock, the catalyst of the present invention advantageously serves to provide HDS and HDN activity with excellent hydroconversion activity.

In accordance with the present invention, the process for treating such a feedstock with the catalyst of the present invention includes providing the suitable catalyst and feedstock, and exposing the feedstock to the catalyst at hydroprocessing conditions including a temperature of between about 230° C. and about 450° C., a pressure of between about 100 psi and about 1000 psi, a space velocity (LHSV) between about 0.5 $h^{-1}$ and about 20.0 $h^{-1}$, and a hydrogen/feedstock ratio of between about 100 and about 650 Nv/v.

In this regard, the catalyst of the present invention can advantageously be provided in a single reactor, or in two or more reactors, using different configurations between them, if desired, or in combination with other catalysts designed to provide other activity which may be desirable for the particular feedstock, or out of the same feedstock, in question. It is particularly advantageous, however, that the catalyst of the present invention allows the desired results to be obtained in a single reactor.

The feedstock so treated will have an initial sulfur content and an initial olefin fraction, as well as, typically, an initial nitrogen content. The resulting product will have a substantially reduced sulfur content, preferably a substantially reduced nitrogen content, and will have a substantially reduced olefin content when desired, or a different desired olefin retention depending upon operation conditions used, without the decrease in octane values which is common when hydrotreating using conventional catalyst.

The process can be carried out utilizing multiple beds, either in the same reactor or in different reactors. In addition, it has been found that the process temperature for use of the present catalyst is preferably a temperature of between about 250° C. and about 410° C., and that higher temperatures can result in liquid yield loss.

As will be demonstrated in the examples set forth below, the catalyst of the present invention provides for excellent HDS activity, with tolerance to the presence of nitrogen and HDN activity as well, a desired HDO activity, and advantageously provides for high hydroconversion activity thereby reducing the adverse impact on octane values which is currently experienced utilizing conventional hydrotreating catalyst.

Due to the nitrogen tolerance and good hydroconversion activity, the catalyst of the present invention can advantageously be used in a single reactor process where the final product has acceptable sulfur content, and does not need octane value recuperation, and further where the catalyst is not rapidly deactivated and no pre-treatment for nitrogen is needed.

The following examples demonstrate the effectiveness of the catalyst of the present invention for use in treatment of naphtha feedstocks. This data was obtained utilizing high pressure plants having 10–40 CC capacity reactors, and using the following general methodology.

A determined volume of dried catalyst is fed to a stainless steel reactor having a length of 43 cm and an internal diameter of 3.5 cm. A presulfurized feed is prepared by adding 0.9 cc of carbondisulfide or dimethyldisulfide (DMDS) (1.5% v/v) for each 60 cc of naphtha. The catalyst bed is activated and/or presulfurized utilizing this presulfurized feed under the following operating conditions.

For 40 cc of Catalyst:

Pressure: 400 PSIG
$H_2$ Flow: 195 cc/min
Presulfurizing feedstock flow: 25.6 cc/h
Temperatures: 159° C.(1 h) 240° C.(1 h) 280° C.(2 h)

For 30 cc of Catalyst:

Pressure: 400 PSIG
$H_2$ Flow: 146 cc/min
Presulfurizing feedstock flow: 19.2 cc/h
Temperatures: 150° C.(1 h) 240° C.(1 h) 280° C.(2 h)

For 20 cc of Catalyst:

Pressure: 400 PSIG
$H_2$ Flow: 97.33 cc/min
Presulfurizing feedstock flow: 12.8 cc/h
Temperatures: 150° C.(1 h) 240° C.(1 h) 280° C.(2 h)

For 10 cc of Catalyst:

Pressure: 400 PSIG
$H_2$ Flow: 36 cc/min
Presulfurizing feedstock flow: 6.4 cc/h
Temperatures: 150° C.(1 h) 240° C.(1 h) 280° C.(2 h)

In all cases, the LHSV is 0.641/h and $H_2$/feedstock relation is 365 Nv/v. Activation temperatures are utilized so as to provide a final value of 330° C. or 280° C. depending on the process requirements.

After catalyst activation, the catalytic evaluations were carried out. The typical operational conditions used, at bench scale, were temperatures between 280 and 380° C., fixed pressure of 600 psig, space velocity between 1 and 3 $h^{-1}$ and $H_2$/feedstock relation of 440 Nv/v.

EXAMPLE 1

10 cc of a commercial hydrotreatment catalyst (HDT1) containing Ni, Mo, and P (18% wt) supported on alumina were activated at 280° C. and evaluated according to the methodology described above, using an FCC C9+naphtha from the Amuay Refinery. The results are shown in Table 2.

TABLE 2

| | Conventional Catalyst, HDT1 NiMoP/Al$_2$O$_3$ | | | | Feedstock FCC C9+ Naptha from Amuay |
|---|---|---|---|---|---|
| Operation Conditions | | | | | |
| LSHV, h$^1$ | 1 | 1 | 1 | 1 | |
| Pressure, psig | 600 | 600 | 600 | 600 | |
| Temperature, ° C. | 300 | 320 | 340 | 360 | |
| Hours | 7 | 12 | 15 | 20 | |
| Product Quality | | | | | |
| Sulfur, ppm | 153 | 52 | 45 | 43 | 1930 |
| Nitrogen, ppm | 12 | <5 | <5 | <5 | 186 |
| Olefins, wt % | 0.623 | 0.620 | 0.615 | 0.512 | 8.610 |
| i-p/n-p ratio* | 3.10 | 3.12 | 3.10 | 3.12 | 3.14 |
| Average Molecular weight of n-paraffins | 136.0 | 135.8 | 135.7 | 135.7 | 137.5 |
| HDS, wt % | 92.1 | 97.3 | 97.8 | 97.8 | |
| HDN, wt % | 93.5 | >97 | >97 | >97 | |

*isoparaffins/normal paraffins ratio

A high hydrogenating activity toward olefins (HDO between 93.0 and 94.2% wt) is obtained. The HDS activity (hydrodesulfurization), as expected, increases with the temperature from 92.1 through 97% in weight and in a similar way the HDN (hydrodenitrogenation) varies between 93.5 and more than 97% in weight when the temperature increases from 300 to 360° C. However, the average molecular weight of n-paraffins is very close to the average molecular weight of n-paraffins in the feedstock, indicating that the acid catalysis is very poor.

EXAMPLE 2

Commercial dispersible alumina B (Condea™) is mixed with an MFI zeolite (ST-5) containing a ratio Si/Al of 11.7 under protonic form (see chemical composition in Table 3), both powder, in a proportion of 50% (wt) ST-5 and 50% (wt) alumina.

TABLE 3

| MFI Zeolite | Chemical Formula | nAl (10$^{20}$/g) | Crystal size (μm) | Surface Area (m$^2$/g) |
|---|---|---|---|---|
| ST-5 | Na$_{0.23}$H$_{7.38}$Si$_{88.4}$O$_{192}$ | 7.5 | 0.8 | 332 |

*nAl(10$^{20}$/g): Number of total Bronstad sites calculated from chemical formula and Avogadro number (6.02 × 10$^{23}$)

In the mixing process of both solids, 2.5% weight of acetic acid is added, in a proportion or ratio of 2.4 grams of solid per ml of acid. After mixing the solid is passed through a double extrusion press-mixer until the material is homogenized. After this mixture, extrusion is made of the paste so as to form 1/16" extrudates.

The extrudates are dried at room temperature. They are submitted afterwards to a temperature of 120° C. After drying, they are calcined at 550° C. in a furnace for at least 2 more hours. In order to reach this temperature, a heating velocity is used at 60° C. per hour. After calcination, a humidity scale is used to determine the volume of hydration with that of the volume of the solution of ammonium heptamolybdate plus 85% (wt) of phosphoric acid, which will be used in impregnation. The amounts of ammonium heptamolybdate and phosphoric acid are determined and selected to deposit in the final catalyst 12–13% weight of molybdenum and 2.7–3.0% weight of phosphorus.

After this impregnation, the extrudates are dried at room temperature and at 120° C. After drying, the humidity scale is used to determine the volume of nickel nitrate solution needed to deposit in the final catalyst 2.1–2.3% weight of nickel, and the impregnation is carried out.

Finally, the extrudates are dried once more at room temperature and at 120° C., and then calcined at 550° C. during 2 hours using the same heating velocity of 60° C./hour. This catalyst is referred to herein as HYC1 (NiMoP/ST-5+Al$_2$O$_3$) catalyst and is a catalyst according to the present invention.

EXAMPLE 3

Table 4 shows the results obtained with 10 cc of HYC1 catalyst prepared according to Example 2. The catalyst was evaluated according to the procedure described in Example 1.

TABLE 4

| | Hydroconversion Catalyst, HYC1 NiMoP/ST-5 + Al$_2$O$_3$ | | | | Feedstock FCC C9+ Naphtha from Amuay |
|---|---|---|---|---|---|
| Operation Conditions | | | | | |
| LSHV, h$^1$ | 1 | 1 | 1 | 1 | |
| Pressure, psig | 600 | 600 | 600 | 600 | |
| Temperature, ° C. | 300 | 320 | 340 | 360 | |
| Hours | 7 | 10 | 14 | 18 | |

TABLE 4-continued

| | Hydroconversion Catalyst, HYC1 NiMoP/ST-5 + Al$_2$O$_3$ | | | | Feedstock FCC C9+ Naphtha from Amuay |
|---|---|---|---|---|---|
| | Product Quality | | | | |
| Sulfur, ppm | 261 | 136 | 80 | 74 | 1930 |
| Nitrogen, ppm | 39 | 44 | 22 | 8 | 186 |
| Olefins, wt % | 3.659 | 3.454 | 3.347 | 3.256 | 8.610 |
| i-p/n-p ratio | 4.10 | 3.56 | 3.45 | 3.30 | 3.14 |
| Average Molecular weight of n-paraffins | | 119.2 | 112.5 | 106.2 | 137.5 |
| HDS, wt % | 86.5 | 93.0 | 95.9 | 96.2 | |
| HDN, wt % | 79.0 | 76.4 | 88.0 | 95.5 | |

It can be seen that the HYC1 catalyst has a moderate activity in hydrodesulfurization (HDS) which increases (between 86.3 and 96.2) as the temperature increases from 300 to 360° C. The HDS activity is less than that obtained with the Commercial catalyst (HDT1), especially at low temperatures, while they are similar at high temperatures. The olefins hydrogenation (HDO) in this catalyst was moderate, maintaining approximately 40 wt % of the initial olefin content. The average molecular weight of n-paraffins is lower in the HYC1 catalyst as compared with HDT1 catalyst, and it decreases as the temperature increased from 300 to 360° C. This indicates that the HYC1 catalyst has a very important acid function. Another important aspect is the isoparaffins/n-paraffins ratio, which is substantially higher when using the HYC1 catalyst.

This example demonstrates that even though the activity in HDS of this catalyst is slightly reduced as compared to HDT1 catalyst at low temperatures, the HDS activity is very similar at high temperatures, with the advantage that the HYC1 catalyst has a lower HDO, a substantial reduction of the average molecular weight of n-paraffins, and a higher isoparaffins/n-paraffins ratio, which do not occur with the HDT1 catalyst. With the HDT1 catalyst, the hydrogenation of these hydrocarbons leads to the reduction of key components which otherwise help to obtain high octane numbers, furthermore HDT1 catalyst does not exhibit the very important acid function to generate other key components useful to avoid octane loss.

EXAMPLE 4

Following the procedure of Example 2, a similar catalyst was prepared, using alumina and the same ST-5 zeolite having a relation Si/Al of 11.7, but the impregnation was carried out using cobalt instead of nickel (from cobalt nitrate). The content of the elements, cobalt, molybdenum, phosphorus, in the resulting catalyst (referred to as HYC2) is exhibited in Table 5.

TABLE 5

| Chemical Analysis | (% weight) |
|---|---|
| Molybdenum | 8.10 |
| Phosphorus | 1.30 |
| Cobalt | 2.70 |
| Mo + Co + P | 12.10 |
| Co/Co + Mo (atomic) | 0.35 |

EXAMPLE 5

A similar procedure to Example 1 was used to evaluate the HYC2 catalyst. The difference was that 30 cc of catalyst was activated varying the temperature as follows: 150° C. (1 hours), 240° C. (1 hours), 280° C. (2 hour), and that three different naphthas were used, one HVN naphtha, a hydrotreated C9+FCC (to which dimethyldisulfur was added to maintain the CoMoP phase of the sulfured catalyst), and non-hydrotreated naphtha C9+of FCC. The feed characteristics are indicated together with operation conditions and results in Table 6.

TABLE 6

| Feedstock | FEEDSTOCK-1 | FEEDSTOCK-2 | FEEDSTOCK-3 | FEEDSTOCK-4 |
|---|---|---|---|---|
| Sulfur, ppm | 588 (DMDS) | 633 (DMDS) | 1780 | 2010 |
| Total Nitrogen, ppm | 5 | 5 | 207 | 130 |
| Composition, % wt | | | | |
| Olefins, % wt | 0 | 1.975 | 8.127 | 7.984 |
| i-p/n-p ratio | 1.59 | 4.51 | 3.47 | — |
| RON Motor | | | 87.4 | 92.6 |
| MON Motor | | | 75.9 | 81.5 |
| ROAD | | | 81.7 | 87.1 |

| Feedstock | 1 | 2 | 2 | 3 | 3 | 3 | 3 | 4 |
|---|---|---|---|---|---|---|---|---|
| | Operation Conditions | | | | | | | |
| Pressure, psig | 600 | 600 | 600 | 600 | 600 | 600 | 600 | 600 |
| Temperature, ° C. | 280 | 280 | 300 | 300 | 320 | 360 | 370 | 370 |
| Ratio H$_2$/HC,N/v/v | 400 | 400 | 400 | 400 | 400 | 400 | 400 | 400 |
| LHSV, h$^{-1}$ | 1 | 1 | 1 | 1 | 1 | 1 | 1 | 1 |
| HOS | 15 | 23 | 29 | 33 | 36 | 39 | 75 | 105 |

TABLE 6-continued

| | | | Product Quality | | | | | |
|---|---|---|---|---|---|---|---|---|
| Sulfur, ppm | — | — | — | 181 | 60 | 50 | 33 | 39 |
| Nitrogen, ppm | | | | | | | <5 | <5 |
| Olefins, wt % | 0 | 1.877 | 1.205 | 2.388 | 2.144 | 2.003 | 1.815 | 1.715 |
| i-p/n-p ratio | 2.35 | 6.01 | 6.00 | 4.74 | 4.31 | 4.20 | 4.00 | — |
| RON | — | — | — | — | — | — | 86.5 | 91.7 |
| MON | — | — | — | — | — | — | 77.2 | 80.8 |
| ROAD | — | — | — | — | — | — | 81.9 | 86.3 |
| HDS, % wt | N/A | N/A | N/A | 89.8 | 96.6 | 97.2 | 98.2 | 98.1 |
| HDO, % wt | N/A | N/A | N/A | 70.6 | 73.6 | 75.4 | 77.7 | 78.5 |
| Δ RON | — | — | — | — | — | — | −0.9 | −0.9 |
| Δ MON | — | — | — | — | — | — | 1.3 | −0.7 |
| Δ ROAD | — | — | — | — | — | — | 0.2 | −0.8 |

As shown in Table 6, this example demonstrates that the HYC2 catalyst is able to efficiently hydrodesulfurize the non-hydrotreated FCC naphtha reaching an HDS activity between 96.6 and 98.2%, with a moderate HDO activity, between 320° C. and 370° C., and with almost no loss in octane number. With the HYC2 catalyst, only a loss of 0.9 in RON resulted, and a gain in MON (up to 1.3 with feedstock 3) was also observed.

In the case of HVN naphtha, (heavy virgin naphtha, Feed 1), the catalyst is able to raise the isoparaffins/normal paraffins ratio from 1.59 to 2.35, and in the case of hydrotreated FCC naphtha (Feed 2), from 4.51 to 6.01. This increase of isoparaffins/normal paraffins ratio also happens with FCC naphtha that is not hydrotreated.

EXAMPLE 6

A catalyst (HYCPA1) corresponding to U.S. Pat. No. 5,576,256 was obtained to be evaluated. The chemical composition and some physical properties of the MFI zeolite used to prepare this catalyst, are presented in Table 7.

TABLE 7

Chemical Composition of MFI Zeolite

| MFI Zeolite | Chemical Formula | nA1 (10$^{20}$/g) | Crystal size μm | Superf. Area m$^2$/g |
|---|---|---|---|---|
| | Na$_{0.05}$H$_{5.15}$Al$_{5.2}$Si$_{90.8}$O$_{192}$ | 5.4 | 2–3 | 411 |

*nA1(10$^{20}$/g): number of rated Bronsted sites (totals) calculated from the chemical formula The content of elements in the HYCPA1 catalyst is exhibited in Table 8.

TABLE 8

Percentage of content of metals in HYCPA1 catalyst

| Chemical Analysis | % weight |
|---|---|
| Molybdenum | 4.30 |
| Phosphorus | 0.71 |
| Cobalt | 2.10 |
| Gallium | 0.41 |
| Chromium | 0.06 |
| Mo + Co + P | 7.10 |
| Co/Co + Mo (atomic) | 0.45 |

The catalytic evaluation procedure of Example 1 was used so as to evaluate 30 cc of HYCPA1 catalyst. The results and the operation conditions used to evaluate this catalyst are shown in Table 9.

TABLE 9

Results of the HYCPA1 catalytic system evaluation

| Feedstock | FEEDSTOCK-1* | FEEDSTOCK-2** | FEEDSTOCK-3 | FEEDSTOCK-4 |
|---|---|---|---|---|
| Sulfur, ppm | 588 (DMDS) | 633 (DMDS) | 1780 | 2010 |
| Total Nitrogen, ppm | 5 | 5 | 207 | 130 |
| Olefins, wt. % | 0 | 1.975 | 8.127 | 7.984 |
| i-p/n-p ratio | 1.59 | 4.51 | 3.47 | — |
| RON | — | — | 87.4 | 92.6 |
| MON | — | — | 75.9 | 81.5 |
| ROAD | — | — | 81.7 | 87.1 |

| Feedstock | 1 | 2 | 3 | 3 | 3 | 3 | 4 |
|---|---|---|---|---|---|---|---|

Operation conditions

| | | | | | | | |
|---|---|---|---|---|---|---|---|
| Pressure, psig | 600 | 600 | 600 | 600 | 600 | 600 | 600 |
| Temperature, °C. | 280 | 300 | 300 | 320 | 360 | 370 | 370 |

TABLE 9-continued

Results of the HYCPA1 catalytic system evaluation

| Ratio H$_2$/HC,N/v/v | 400 | 400 | 400 | 400 | 400 | 400 | 400 |
|---|---|---|---|---|---|---|---|
| LHSV, h$^{-1}$ | 1 | 1 | 1 | 1 | 1 | 1 | 1 |
| Hours | 32 | 48 | 56 | 59 | 62 | 107 | 131 |
| Product Quality | | | | | | | |
| Sulfur, ppm | — | — | 105 | 75 | 47 | 196 | 459 |
| Nitrogen, ppm | — | — | 25 | 20 | 11 | — | — |
| Olefins, wt % | 0 | 0.187 | 0.373 | 0.567 | 0.581 | 2.186 | 2.642 |
| i-p/n-p ratio | 2.21 | 5.18 | 4.19 | 4.11 | 3.87 | 3.77 | — |
| RON | — | — | — | — | — | 82.5 | 89.1 |
| MON | — | — | — | — | — | 74.0 | 79.0 |
| ROAD | — | — | — | — | — | 78.3 | 84.1 |
| HDS, % wt | N/A | N/A | 94.1 | 95.8 | 97.4 | 89.0 | 77.2 |
| HDO, % wt | N/A | N/A | 95.4 | 93.0 | 92.9 | 73.1 | 66.9 |
| Δ RON | — | — | — | — | — | −4.9 | −3.5 |
| Δ MON | — | — | — | — | — | −1.9 | −2.5 |
| Δ ROAD | — | — | — | — | — | −3.4 | −3.0 |

*HVN and **HCN Hydrotreated

As shown in Table 9, this example demonstrates that the HYCPA1 catalyst does not maintain the HDS activity constant with FCC naphtha that is non-hydrotreated, since the HDS activity which varies between 94.1 and 87.4% in weight, between 300 and 370° C., experiences an important deactivation, decreasing to 77.2% at 370° C., and on the other side, presents a significant loss of octane number with feedstock 3 (RON=−4.9 and MON=−1.9), and with feedstock 4 (RON=−3.5 and MON=−2.5).

In the case of HVN (feed 1), this catalyst is able to efficiently increase the isoparaffins/normal paraffins ratio from 1.59 to 2.21, and in the case of hydrotreated FCC naphtha (Feed 2) from 4.51 to 5.18. Similar results are demonstrated with the FCC naphtha non-hydrotreated (Feed 3). The increase, of isoparaffins/normal paraffins ratios are lower than those presented by HYC2 catalyst.

Note that the HYCPA1 catalyst showed some deactivation after 107 hours of operation time, as can be observed clearly from the HDS activity demonstrated from 97.4 wt % at 360° C., 62 hours, to 89.0 wt % at 370° C., 107 hours, and the HDO activity decreased too.

EXAMPLE 7

In this example, average molecular weight was measured for resulting product obtained using HYC2 catalyst of Example 5, HYCPA1 catalyst of Example 6 and also with the conventional HDT1 catalyst. Average molecular weight and i-p/n-p ratio was measured of the product for processes carried out at different temperature. The results and the operation conditions used to evaluate the catalysts are shown in Table 10.

TABLE 10

Feedstock molecular weights and i-p/n-p ratio against products of the evaluation of HYC2, HYCPA1 and HDT-1 catalyst with non hydrotreated C9+ FCC naphthas of Amuay

| FEEDSTOCK PROPERTIES | FEEDSTOCK 3 | FEEDSTOCK 3* |
|---|---|---|
| Sulfur, ppm | 1780 | 1930 |
| Nitrogen, ppm | 207 | 186 |
| Average Molecular Weight | | |
| Paraffins | 136.5 | 137.0 |
| Isoparaffins | 138.7 | 140.1 |
| Naphthenes | 129.8 | 126.7 |
| Aromatics | 129.3 | 128.2 |
| i-p/n-p ratio | 3.47 | 3.14 |

| Feedstock | 3 | 3 | 3 | 3 | 3 | 3 | 3* | 3* | 3* |
|---|---|---|---|---|---|---|---|---|---|
| OPERATION CONDITIONS | | | | | | | | | |
| Pressure, psig | 600 | 600 | 600 | 600 | 600 | 600 | 600 | 600 | 600 |
| Temperature, °C. | 300 | 320 | 360 | 300 | 320 | 360 | 300 | 320 | 360 |
| LHSV, h$^{-1}$ | 1 | 1 | 1 | 1 | 1 | 1 | 1 | 1 | 1 |
| RESULTS | HYC2 | | | HYCPA1 | | | HDT1 | | |
| Average Molecular Weight | | | | | | | | | |
| Paraffins | 130.4 | 116.9 | 102.1 | 133.3 | 131.6 | 121.5 | 136.0 | 135.8 | 135.7 |
| Isoparaffins | 126.3 | 125.8 | 119.6 | 135.6 | 131.6 | 132.8 | 134.9 | 134.8 | 134.3 |
| Naphthenes | 122.6 | 123.5 | 122.3 | 122.4 | 123.9 | 122.8 | 121.9 | 121.6 | 122.0 |

TABLE 10-continued

Feedstock molecular weights and i-p/n-p ratio against products of the evaluation of HYC2,
HYCPA1 and HDT-1 catalyst with non hydrotreated C9+ FCC naphthas of Amuay

| Aromatics | 129.4 | 128.2 | 127.8 | 128.2 | 129.6 | 129.3 | 128.9 | 128.9 | 128.8 |
|---|---|---|---|---|---|---|---|---|---|
| i-p/n-p ration | 4.74 | 4.31 | 4.20 | 4.19 | 4.11 | 3.87 | 3.10 | 3.12 | 3.12 |

This table demonstrates that the HYC2 catalyst in accordance with the present invention is more active in the process of molecular weight reduction, especially of the n-paraffins, and the i-p/n-p ratio increases. The HYCPA1 and finally the commercial HDT1 catalyst are not as active in these functions. In this regard, the HYC2 catalyst contains MFI zeolite having an Si/Al ratio of 11.7, the HYCPA1 has an MFI zeolite having an Si/Al ratio of 18, and finally the commercial catalyst HDT1 does not contain zeolite, but only alumina. As an example, FIG. 2 illustrates the evolution of the average molecular weight of the n-paraffins with the operation temperature used to evaluate the different catalysts.

Figure 2:
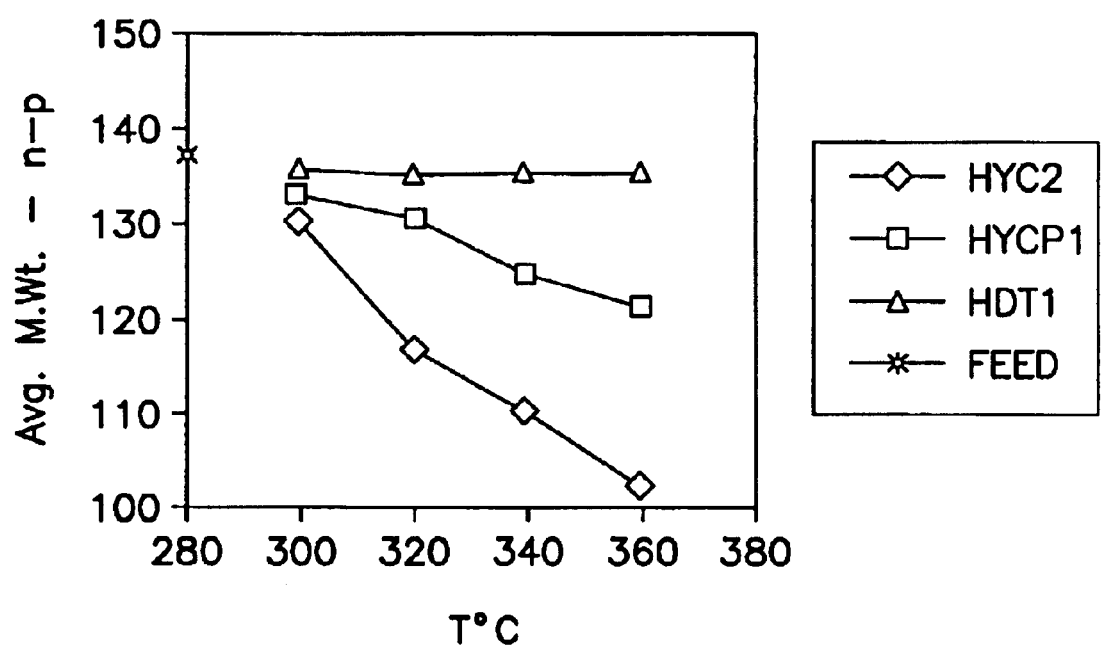
FIG. 2 illustrates the relationship between process temperature and average molecular weight for several feedstocks and for processes carried out utilizing different types of catalysts.

In FIG. 2, it can be observed clearly that HYC2 catalyst has more capacity than the HYCPA1 and HDT1 catalysts to reduce the n-paraffins average molecular weight in an operating temperature period between 300 and 360° C. in the process of a non-hydrotreated C9+(FCC) naphtha coming from the Amuay Refinery. Note that he HDT1 is much less efficient since it maintains practically the value of said molecular weight almost constant with the temperature. This activity of the HYC2 catalyst is particularly desirable since reduction of average molecular weight of n-paraffins, and increases of i-p/n-p ratio, serve to improve octane values of the hydrocarbon.

EXAMPLE 8

A similar catalytic evaluation procedure was used as in Example 5 so as to evaluate 30 cc of HDT1 catalyst using non-hydrotreated FCC naphtha. The results are compared in Table 11 with the results obtained with HYCPA1 catalyst of Example 6 and with the HYC2 catalyst (Example 5) in accordance with the present invention. The HYC2 catalyst is able to almost maintain the octane number of the Feedstock: −0.9 in RON and an increase in MON of 1.3 for Feedstock 3 and a small loss of 0.7 with Feedstock 4, while the HYCPA1 catalyst loses octane value significantly: RON=−4.9 and MON=−1.9 with Feedstock 3, and RON=−3.5 and MON=−2.5 with Feedstock 4, and still more losses occur in the case of the commercial HDT1 catalyst: RON=−6.1 and MON=−3.1.

Finally, the HYC2 catalyst is also capable of efficiently removing the sulfur as well as the HDT1 commercial catalyst, reaching high HDS activities of 96.6 wt % to 320° C. (Table 11) and more than 98% wt to 370° C.

TABLE 11

| FEEDSTOCK | FEEDSTOCK 3 | FEEDSTOCK 4 | FEEDSTOCK 5 |
|---|---|---|---|
| Total Sulfur, ppm | 1780 | 2010 | 2080 |
| Nitrogen, ppm | 207 | 130 | 203 |
| Olefins, wt % | 8.127 | 7.984 | 8.775 |
| i-p/n-p ratio | 3.47 | — | — |
| RON | 87.4 | 92.6 | 89.1 |
| MON | 75.9 | 81.5 | 79.3 |

TABLE 11-continued

| ROAD | 81.7 | | 87.1 | | 84.2 |
|---|---|---|---|---|---|
| FEEDSTOCK | 3 | 3 | 4 | 4 | 5 |

| OPERATION CONDITIONS | | | | | |
|---|---|---|---|---|---|
| Pressure, psig | 600 | 600 | 600 | 600 | 600 |
| Temperature, °C. | 370 | 370 | 370 | 370 | 320 |
| LHSV, h$^{-1}$ | 1 | 1 | 1 | 1 | 1 |

| RESULTS | HYC2 | HYCPA1 | HYC2 | HYCPA1 | HDT1 |
|---|---|---|---|---|---|
| Sulfur, ppm | 33 | 196 | — | 459 | <20 |
| Nitrogen, ppm | <5 | — | <5 | — | <5 |
| Olefins, wt % | 1.815 | 2.186 | 1.715 | 2.642 | 0.485 |
| i-p/n-p ratio | — | 3.77 | — | — | — |
| RON | 86.5 | 82.5 | 91.7 | 89.1 | 83.0 |
| MON | 77.2 | 74.0 | 80.8 | 79.0 | 76.2 |
| Δ RON | −0.9 | −4.9 | −0.9 | −3.5 | −6.1 |
| Δ MON | 1.3 | −1.9 | −0.7 | −2.5 | −3.1 |
| HDS, wt % | 98.2 | 89.0 | — | 77.2 | 99.0 |
| HDN, wt % | >96.2 | — | >96.2 | — | >97.5 |
| HDO. wt % | 77.7 | 73.1 | 78.5 | 66.9 | 94.5 |

EXAMPLE 9

The catalytic evaluation procedure of Example 5 was used, employing a unit having a higher capacity reactor (50–150 cc), so as to evaluate 100 cc of the HYC2 catalyst over a long period of time with different feedstocks having different nitrogen and sulfur content, different octane values and different compositions. The procedure used is as follows.

100 cc of dried catalyst is diluted with a 1:1 by volume amount of silicon carbide (carborundum), and was fed to a reactor having a length of 1.2 m (T/T) and an internal diameter of 2.5 cm. In order to avoid polymerization reactions and gum formation, a 45 cc bed of commercial HDT catalyst (HDT1) is positioned at the top of the reactor (180–200° C.) allowing hydrogenation of the compounds which normally are precursors to the formation of gums.

The catalyst is presulfurized utilizing a presulfurizing feed, by adding 70 cc of carbondisulfide for every 5 liter of hydrotreated naphtha. The schedule of presulfurization of the catalyst, after drying and calcination, is as follows:

| Operation | Downflow |
|---|---|
| Catalyst Volume | 100 cc diluted 1:1 vol/vol with SiC |
| Hydrogen Pressure | 400 psig |
| Presulfurizing Feed | Hydrotreated naphtha mixture (5 lts) + CS2 (70 cc) |
| Spatial Velocity | 2.0 v/v/h |
| Relation H$_2$/HC | 300 Nv/V |
| Presulfurizing Feed Flow | 144.6 gr/hr |
| Hydrogen Flow | 6.5 gr/hr |

-continued

| Operation | Downflow |
|---|---|
| Temperatures | 150° C. (maintaining mixture pumping for 1 hour) |
| | 240° C. (maintaining mixture pumping for 1 hour) |
| | 280° C. (maintaining mixture pumping for 2 hour) |
| T Increment Speed | 30° C./h |

Once activation is completed, evaluation tests of the catalyst were begun starting with a "white" condition using hydrotreated naphtha (without sulfur or nitrogen content) at standard hydrotreatment conditions (500–600 psi and 290° C.). This establishes a starting point of the test.

Table 12 set forth below indicates the various naphthas used in this test, as well as operating conditions and results obtained in terms of HDS, octane values, liquid hydrocarbon yields and the like for 711 hours of operation at different rates of severity.

TABLE 12

| Feed | Temperature ° C. | LHSV h$^{-1}$ | Time on stream hours | Yield % (*) | ΔMON | HDS N/A |
|---|---|---|---|---|---|---|
| HVN <5 ppm T.Nit., 588 ppm Sulf. | 290 | 1.5 | 411 | 84.9 | 19.7 | N/A |
| FCC C7+ 48 ppm. T.Nit, 1600 ppm Sulf. 12.5% by weight of Olefins | 360 | 3 | 190 | 98.2 | 0.3 | 97.9 |
| FCC C7+ 48 ppm. T.Nit, 1600 ppm Sulf. 12.5% by weight of Olefins | 360 | 3 | 302 | 98.8 | −0.2 | 99 |
| FCC C7+ 48 ppm. T.Nit, 1600 ppm Sulf. 12.5% by weight of Olefins | 360 | 3 | 413 | 98.8 | −0.4 | 98.6 |
| FCC C7+ 48 ppm. T.Nit, 2210 ppm Sulf. 10.8% by weight of Olefins | 360 | 3 | 595 | 99.7 | 0.4 | 99.3 |
| FCC C7+ 48 ppm. T.Nit, 2210 ppm Sulf. 10.8% by weight of Olefins | 360 | 4 | 642 | 99.6 | 0.1 | 96.4 |
| FCC C7+ 48 ppm. T.Nit, 2290 ppm Sulf. 10.8% by weight of Olefins | 370 | 4 | 674 | 99.2 | −0.1 | 98.9 |
| FCC C7+ 138 ppm. T.Nit, 2290 ppm Sulf. 9.5% by weight of Olefins | 370 | 4 | 711 | 99.6 | 0.2 | 98.6 |

The stability test clearly demonstrates that the HYC2 catalyst of the present invention efficiently processes various types of naphthas having different content of nitrogen and sulfur, all the while maintaining an excellent HDS activity, and a high liquid hydrocarbon yield, and also while maintaining octane values as desired. This activity was maintained through severe operating conditions including 370° C., LHSV of 4 h$^{-1}$, and H$_2$/HC of 250 N vol/vol.

EXAMPLE 10

The catalytic evaluation procedure of Example 9 was used, employing a unit having 3 reactors in parallel (50–150 cc capacity), so as to evaluate, simultaneously, the following three catalysts: 100 cc of HYC2, 100 cc of HDT1 and 100 cc of HDT2 (commercial catalyst consisting of CoMoP/Al$_2$O$_3$), with a feedstock having 17 wt % olefins, 1260 wt ppm of sulfur and 80 wt ppm of nitrogen (Table 13).

TABLE 13

| Feedstock & FCC Naphtha | |
|---|---|
| Total sulfur, ppm | 1260 |
| Total nitrogen, ppm | 80 |
| RON | 94.1 |
| MON | 81.2 |
| ROAD | 87.7 |
| PONA, wt % | |
| Paraffins | 19.5 |
| Olefins | 17.2 |
| Naphthenes | 10.8 |
| Aromatics | 50.9 |
| No identified/C13+ | 1.6 |

The operation conditions of this test were varied as follows:

| Temperature, ° C. | 260–350 |
|---|---|
| Pressure, psig | 250–500 |
| LHSV, h$^{-1}$ | 3–8 |
| H$_2$/Feedstock, N v/v | 110–250 |

The objective of this test was to compare the performance in HDS/octane loss of the HYC2 catalyst with different conventional hydrotreating catalysts at different operation conditions, especially at low severity.

Figure 3:
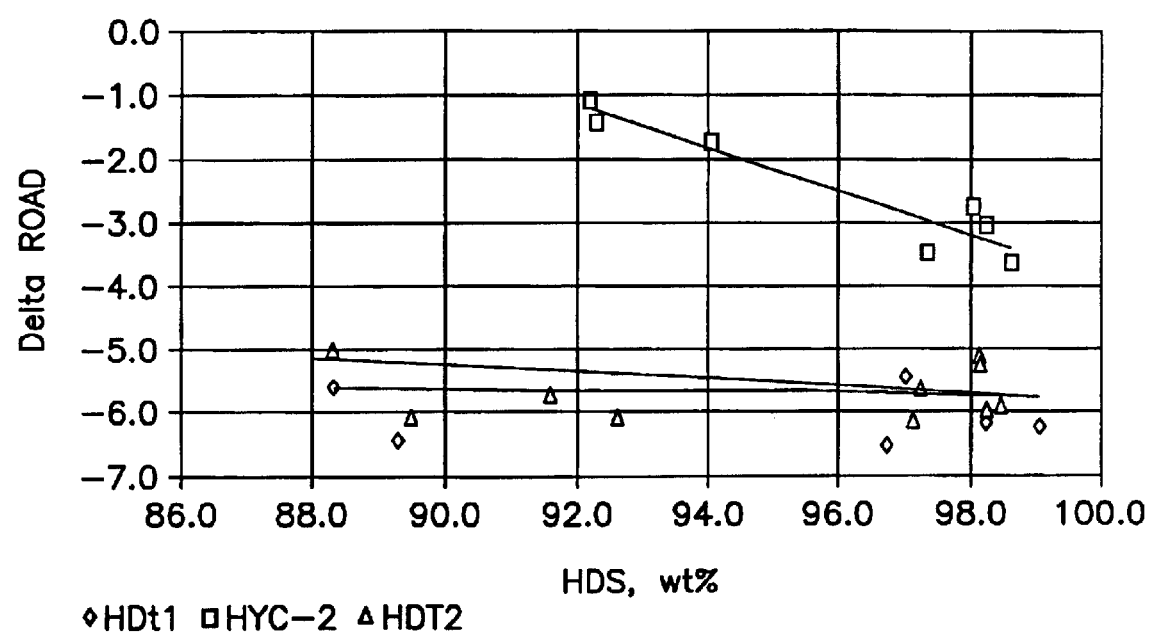
FIG. 3 illustrates the relationship between Delta Octane (Delta Road) and HDS (Hydrodesulfurization) activity for different types of catalysts.

FIG. 3 illustrates the Delta Octane or octane loss (ROAD) as a function of the HDS activity for different catalysts. This figure shows the HDS activity variation between 88.0 wt % and 99.0 wt % for the conventional hydrotreating catalysts, and between 92.0 and 99.0 wt % for the HYC2 catalyst. The octane loss decreases when the HDS activity is lowered. This octane loss is higher for the conventional hydrotreating catalysts.

For Example, at 98.0 wt % of HDS activity, the octane loss is about 5.8 with conventional hydrotreating catalysts versus about 3.3 obtained with the HYC2 catalyst. When the HDS activity is reduced to 92.0 wt %, the difference in octane loss is still higher: 5.5 versus 1.1. Regarding these results, the HDO activities were 89.0 and 46.0 wt % for octane loss of 5.5 and 1.1, respectively.

This example demonstrates that HYC2 catalyst maintains octane values at a maximum as compared to conventional catalysts. The HYC2 catalyst tends to retain more olefins in the product, compared to the conventional hydrotreating catalysts, at similar HDS activity.

The previous examples and this example demonstrate that the HYC2 catalyst has a variable selectivity according to the operation conditions used in the process: hydroconversion at high severity, high HDS/HDO ratio at low severity and both catalytic properties at mild severity. These catalytic properties can be used adequately according to naphtha composition to be processed.

It should be appreciated that a catalyst has been provided which advantageously has HDS and HDN activity, without extreme sensitivity to nitrogen, and which maintains the octane values of the feed.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for hydroconversion of hydrocarbon feed, comprising the steps of:
    providing a hydrocarbon feed having an initial sulfur content;
    providing a hydroconversion catalyst comprising
    a support comprising a mixture of zeolite and alumina, wherein said support comprises between about 10 and about 90% wt of said zeolite and between about 90 and about 10% wt of said alumina, said zeolite is MFI zeolite having an Si/Al ratio of between about 1 and about 20; and
    (2) a metal active phase on said support and comprising a first metal selected from group 6 of the periodic table of elements, a second metal selected from the group consisting of group 8, group 9 and group 10 of the period table of elements, and a third element selected from group 15 of the periodic table of elements, wherein said metal active phase contains at least about 1% (wt) of said first metal, at least about 0.5% (wt) of said second metal, and at least about 0.2% (wt) of said third element;
    exposing said feed to said catalyst under hydroconversion conditions so as to provide a product having a final sulfur content less than said initial sulfur content.

2. The process according to claim 1, wherein said hydrocarbon feed has an initial molar ratio of iso-paraffins to n-paraffins, and said product has a final molar ratio of iso-paraffins to n-paraffins which is greater than said initial molar ratio.

3. The process according to claim 1, wherein said hydrocarbon feed has an initial molecular weight of n-paraffins, and said product has a final molecular weight of said n-paraffins which is less than said initial molecular weight.

4. The process according to claim 1, wherein said first metal is molybdenum.

5. The process according to claim 1, wherein said second metal is selected from the group consisting of nickel, cobalt and mixtures thereof.

6. The process according to claim 1, wherein said third element is phosphorus.

7. The process according to claim 1, wherein said hydroconversion conditions include a temperature of between about 230 and about 450° C.

8. The process according to claim 1, wherein said MFI zeolite is ST-5 zeolite.

9. The process according to claim 1, wherein said feed contains nitrogen in an amount of at least about 1 ppm.

10. The process according to claim 1, wherein said exposing step is carried out in a single reactor.

11. The process according to claim 1, wherein said exposing step is carried out in at least two reactors using different configurations.

12. The process according to claim 1, wherein said feed is a naphtha feedstock.

13. The process according to claim 1, wherein said Si/Al ratio is less than about 15.

14. The process according to claim 1, wherein said Si/Al ratio is less than about 12.

* * * * *